United States Patent Office 3,134,806
Patented May 26, 1964

3,134,806
m-DIMETHYLAMINO-p-METHYL PHENYL-N-METHYL CARBAMATE AND p-DIMETHYL-AMINO m-METHYL PHENYL-N-METHYL-CARBAMATE
Rudolf Heiss and Ernst Böcker, Cologne-Stammheim, and Gunter Unterstenhöfer, Opladen, Germany, assignors to Farbenfabriken Bayer Aktiengesellschaft, Leverkusen, Germany, a corporation of Germany
No Drawing. Filed July 13, 1961, Ser. No. 123,621
Claims priority, application Germany July 20, 1960
3 Claims. (Cl. 260—479)

The present invention relates to and has as its objects new and useful insecticidal carbamic acid esters of the general formula

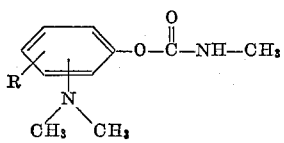

wherein the dimethylamino group is in the m-position and R denotes a p-positioned methyl group or the dimethylamino group may stand in the p-position and R be a methyl radical in any other position. Furthermore this invention has as its objects various processes relating to the aforementioned compounds.

These new substances are produced in a manner known in principle either e.g. by reacting the corresponding dimethylaminophenols with methyl-isocyanate or methylcarbamic acid chloride, or from methylamine with corresponding chloroformic acid dimethylaminophenyl ester or carbonic acid-bis-(dimethylaminophenyl ester), or from suitable dimethylaminophenols and N-methylphenyl-carbamate.

The compounds according to this invention exhibit an insecticidal activity which is remarkably superior to that of the hitherto known 3-dimethylaminophenyl-N-methylcarbamate, as the following comparison shows:

[m-Dimethylaminophenyl-N-methylcarbamate]

| Concentration in percent (aqueous emulsion) | Plutella maculipennis | Drosophila | Aphids | Spider mites |
|---|---|---|---|---|
| | Killing rate, percent | | | |
| 0.2 | 100 | 0 | 100 | 40 |
| 0.02 | 0 | | 40 | |

[3-dimethylamino-4-methylphenyl-N-methylcarbamate]

| Concentration in percent (aqueous emulsion) | Plutella maculipennis | Drosophila | Aphids | Spider mites |
|---|---|---|---|---|
| | Killing rate, percent | | | |
| 0.2 | 100 | 40 | 100 | 100 |
| 0.02 | 100 | | 90 | |

[4-dimethylamino-3-methylphenyl-N-methylcarbamate]

| Concentration in percent (aqueous emulsion) | Plutella maculipennis | Drosophila | Aphids | Spider mites syst. S. granarium |
|---|---|---|---|---|
| | Killing rate, percent | | | |
| 0.2 | 100 | 100 | 100 | 100 | 100 |
| 0.02 | 100 | 100 | 40 | | |

The above described emulsions were prepared as follows: Aqueous dilutions of these compounds have been prepared by mixing the active ingredient with the same amount of dimethyl formamide as an auxiliary solvent adding thereto 20% by weight referred to active ingredient of a commercial emulsifier consisting of a benzyl hydroxy polyglycol ether containing about 10 to 15 glycol residues, and diluting at last this premixture with water to the desired concentration as indicated above.

The tests were carried out as follows:

(a) Against caterpillars of the type diamond black moth (*Plutella maculipennis*): White cabbage has been sprayed drip wet with aqueous emulsions as prepared above and in a concentration as shown above. Caterpillars (10 each) have been placed on the sprayed leaves of the white cabbage. The living status has been determined after 24 and 48 hours.

(b) Against flies (Drosophila): About 50 flies are placed under covered petri dishes in which drip wet filter papers have been placed which were sprayed with an insecticidal solution of a concentration as shown above. The living status of the flies has been determined after 24 hours.

(c) Against aphids (contact-insecticidal action) of the type *Doralis fabae*: Heavily infested bean plants (*Vicia faba*) have been sprayed drip wet with solutions as prepared above. The effect has been determined by evaluation after 24 hours by counting the dead pests either on the surface of the soil or still remaining on the plants.

(d) Against spider mites (contact-insecticidal action): Bean plants (*Phaseolus vulgaris*) of about 15 inches height are sprayed drip wet with solutions as indicated above. The bean plants have been infested heavily with the two-spotted spider (species *Tetranychus telarius*). Evaluation has been carried out after 24, 48 and 192 hours.

The following examples are given for the purpose of illustrating the present invention.

Example 1

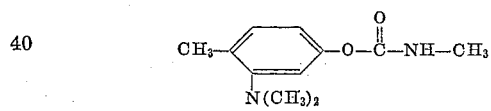

30.2 grams (0.2 mol) of 3-dimethylamino-4-methylphenol are treated with a solution of 12.5 grams (0.22 mol) of methylisocyanate in anhydrous dioxane. After the addition of 3 drops of triethylamine, the reaction mixture warms up very slightly. In order to complete the reaction, the mixture is further heated in a closed flask to 60° C. for an hour. The solvent is distilled off under vacuum, the residue digested with water, filtered off and dried in a desiccator. After re-crystallization from ligroin a product of M.P. 82–83° C. is obtained.

Example 2

The same compound as described in Example 1 may be prepared as follows: to a solution of 30 grams of phosgene in 300 ml. of benzene there is added dropwise while stirring at a temperature of 5–10° C. a benzene solution of 30.2 grams of 3-dimethylamino-4-methylphenol and simultaneously 20 grams of triethylamine. There should always be a slight excess of aminophenol. When the whole has been added, the mixture is further stirred for 10 minutes and the excess phosgene then drawn off under vacuum. The precipitated salt is filtered off and 12.4 grams of methylamine are introduced into the filtrate at 5–10° C. while stirring. After filtering off the methylammonium chloride, the solvent is distilled off and the residue recrystallized from ligroin. M.P. 82–83° C.

Example 3

The same compound as described in Example 1 may also be prepared the following way: 55 grams of phosgene are introduced into a mixture of 151 grams of 3-dimethylamino-4-methylphenol, 175 ml. of water and 100 ml. of benzene. The reaction solution is kept alkaline by the simultaneous dropwise addition of 98 grams of 45% NaOH; during the reaction the temperature rises from 20 to 45° C. After completion of the reaction, a further small amount of phosgene is introduced so that the solution shows a weakly acid reaction. The benzenic layer is separated from the aqueous layer, diluted with 150 ml. of benzene and 107 ml. of a 29.2% methylamine solution are added dropwise at 5–10° C. The mixture is further stirred for 4 hours, extracted with 500 ml. of 2 N NaOH and the benzenic layer washed several times with water.

The solvent is distilled off and the reaction product is re-crystallized from ligroin.

*Example 4*

The same compound as described in Example 1 may be prepared also as follows: 35 grams of phenyl-N-methylcarbamate and 35 grams of 2-dimethylamino-4-hydroxy-1-methylbenzene are heated together with 1.5 grams of sodium acetate under a vacuum of 12 mm. Hg to 80–85° C. for 1 hour. The vacuum is adjusted to 1.4–1.5 mm. Hg and the temperature slowly raised to an internal temperature of 98° C. At this temperature, 130 grams of 1.2.4-trichlorobenzene are distilled through. The transition temperature is 48–50° C. 161 grams of distillate are thus obtained from which 30 grams of pure phenol can be extracted with dilute sodium hydroxide solution. The reaction mixture is dissolved in 100 grams of benzene and extracted several times with 2 N sodium hydroxide solution, in order to remove phenolic constituents. The extract of sodium hydroxide solution amounts to 11 grams. After distilling off the benzene, a yield of 27.3 grams of 3-dimethylamino-4-methylphenyl-N-methyl-carbamate (M.P. 81° C.) is obtained from the refined product.

*Example 5*

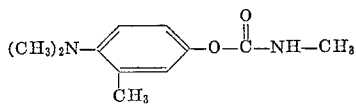

30.2 grams (0.2 mol) of 4-dimethylamino-3-methylphenol are treated with a solution of 12.5 grams of methylisocyanate in anhydrous dioxane. After the addition of 3 drops of triethylamine, the solution is heated to 60° C. in a closed vessel for an hour. The solvent is distilled off. The residue is dissolved in benzene and the solution washed with 2 N NaOH, then with water to which a few drops of hydrochloric acid have been added, and finally with pure water. The benzenic solution is dried with $CaCl_2$ and concentrated under vacuum. The carbamate thus obtained is pure and melts at 94.5–95.5° C.

By the same way there may be obtained the compound of the following formula

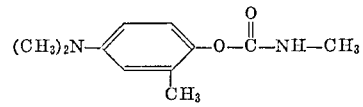

We claim:

1. A compound of the formula

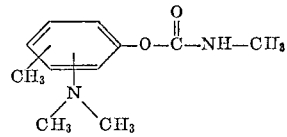

selected from the group consisting of (1) m-dimethylamino-p-methyl phenyl-N-methylcarbamate, and (2) p-dimethylamino metamethyl phenyl-N-methylcarbamate.

2. The compound of the following formula

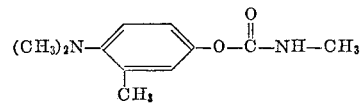

3. The compound of the following formula

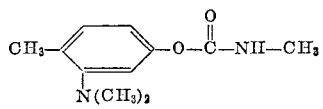

References Cited in the file of this patent

UNITED STATES PATENTS

| | | |
|---|---|---|
| 3,053,895 | Keading | Sept. 11, 1962 |
| 3,060,225 | Shulgin | Oct. 23, 1962 |

FOREIGN PATENTS

| | | |
|---|---|---|
| 446,303 | Canada | Jan. 20, 1948 |

OTHER REFERENCES

Kolbezen et al.: Journal Agric. and Food Chem., 2, 864–70 (1954).